US005532688A

United States Patent [19]

Kudoh

[11] Patent Number: 5,532,688

[45] Date of Patent: Jul. 2, 1996

[54] SELECTIVE CALLING RECEIVER CAPABLE OF PROVIDING A MESSAGE BY A SPEECH SOUND

[75] Inventor: Kazuhiro Kudoh, Tokyo, Japan

[73] Assignee: NEC Corporation, Japan

[21] Appl. No.: 263,121

[22] Filed: Jun. 20, 1994

[30] Foreign Application Priority Data

Jun. 21, 1993 [JP] Japan .................................... 5-173746

[51] Int. Cl.$^6$ ........................................ H04Q 7/14

[52] U.S. Cl. ........................................ 340/825.44

[58] Field of Search ......................... 340/825.44, 825.22, 340/825.48; 379/56, 57; 455/38.2

[56] References Cited

U.S. PATENT DOCUMENTS

| | | | |
|---|---|---|---|
| 4,495,647 | 1/1985 | Burke et al. | 340/825.44 |
| 4,769,642 | 9/1988 | Davis et al. | 340/825.44 |
| 4,949,085 | 8/1990 | Fisch et al. | 340/825.44 |
| 5,153,579 | 10/1992 | Fisch et al. | 340/825.44 |

FOREIGN PATENT DOCUMENTS

| | | |
|---|---|---|
| 63-5931 | 2/1988 | Japan . |
| 63-9163 | 3/1988 | Japan . |
| 87/04309 | 7/1987 | WIPO . |
| 91/02433 | 2/1991 | WIPO . |

*Primary Examiner*—Brian Zimmerman
*Assistant Examiner*—Edwin C. Holloway, III
*Attorney, Agent, or Firm*—Ostrolenk, Faber, Gerb & Soffen

[57] ABSTRACT

In order to allow a user of a selective calling receiver to accurately hear and recognize a received message in accordance with his or her pace when the message is outputted, the selective calling receiver includes a speech data storage device for storing speech data corresponding to a predetermined message, a speech output device for outputting speech on the basis of the speech data stored in the speech data storage device, and a first speech output control device for reading out speech data corresponding to a message contained in a received selective call signal from the speech data storage device and causing the speech output device to output speech on the basis of the speech data. The receiver also includes a second speech output control device for sectioning the message contained in the received selective call signal into a predetermined number of pieces of unit information, reading out speech data corresponding to predetermined unit information of all the unit information from the speech data storage means, and causing the speech output device to output a speech sound on the basis of the speech data.

15 Claims, 6 Drawing Sheets

SELECTIVE CALLING RECEIVER CAPABLE OF PROVIDING A MESSAGE BY A SPEECH SOUND

BACKGROUND OF THE INVENTION

1. FIELD OF THE INVENTION

The present invention relates to a selective calling receiver and, more particularly, to a selective calling receiver capable of providing a message by a speech sound.

2. DESCRIPTION OF THE RELATED ART

Recently, selective calling receivers, well known as "pocket telephone bell" or the like, have been widely used. Selective calling receivers are designed to be always carried by individuals and signaled by a selective call signal in an urgent case. Some of the selective calling receivers are designed to display a message (e.g., telephone number of a calling party), contained in a received selective call signal, on a liquid crystal display. Selective calling receivers with a function to provide a message by speech sound instead of displaying it, have been developed (e.g., Japanese Patent Publication No. 63-5931 and Japanese Utility Model Publication No. 63-9163).

A box-type or card-type selective calling receiver has a sufficient space for displaying a message and therefore the message can be notified by performing only a display without a speech sound. In, for example, a pencil type selective calling receiver, however, since a sufficient space for displaying a message cannot be ensured, the only means of notifying the message is to output it by a speech sound. In case a visually handicapped person uses a selective calling receiver, a function of outputting the message by the speech sound is important regardless of the shape of the selective calling receiver.

In a conventional selective calling receiver of this type, a message can be repeatedly outputted by the speech sound a several times upon switching operation or the like.

Such a conventional selective calling receiver, however, is designed to repeatedly output one message as a unit by a speech sound. For this reason, a user may fail to hear a part of one message or may not remember the message if it is long. Assume that a telephone number to be dialed is notified. In this case, even if the telephone number is continuously outputted by a speech sound, the user may fail to hear one of the digits of the telephone number. In addition, assume that the user dials a telephone number while hearing a speech message. In this case, if the dialing operation cannot catch up with the speed of the speech message, the user cannot dial the telephone number in the end. That is, a problem is posed in terms of convenience in using such a selective calling receiver.

SUMMARY OF THE INVENTION

The present invention has been made in consideration of the above situation, and it is an object of the present invention to provide a selective calling receiver which allows a user to accurately hear and recognize a received message in accordance with his or her pace when the message is outputted with a speech sound.

It is another object of the present invention to provide a selective calling receiver which allows a user to accurately hear and recognize a received message by repeatedly outputting a plurality of characters as a unit message with a speech sound in case a received message consists of the plurality of characters each of which is too short to understand.

It is further object of the present invention to provide a selective calling receiver which allows a user to accurately hear and recognize a received message by repeatedly outputting the same unit of a received message with a speech sound until a predetermined switch is operated.

It is still further provide a selective calling receiver which allows a user to accurately hear and recognize a received message outputting a unit of a received message with a speech sound only one time whenever a predetermined switch is operated.

It is still further object of the present invention to provide a selective calling receiver which allows a user to accurately hear and recognize a received message outputting a unit of a received message by outputting a subsequent unit of a received message with a speech sound after a unit of the message has been output when a predetermined switch is operated.

In order to achieve the above object, according to the present invention, there is provided a selective calling receiver including speech data storage means for storing speech data corresponding to a predetermined meassage, speech output means for outputting a speech sound on the basis of the speech data stored in the speech data storage means, and first speech output control means for reading out speech data corresponding to a message contained in a received selective call signal from the speech data storage means and causing the speech output means to output speech on the basis of the speech data, the receiver comprising second speech output control means for sectioning the message contained in the received selective call signal into a predetermined number of pieces of unit information, reading out speech data corresponding to predetermined unit information of all the unit information from the speech data storage means, and causing the speech output means to output a speech sound on the basis of the speech data.

In addition, the second speech output control means performs control to repeatedly output the speech corresponding to the predetermined unit information.

With the above arrangement, according to the present invention, the second speech output control means sections a message contained in a received selective call signal into a predetermined number of pieces of unit information, and performs control to repeatedly perform speech output for each unit information.

DETAILED DESCRIPTION OF THE PREFERRED EMBODIMENTS

The present invention will now be described below with reference to the accompanying drawings.

Figure 1:
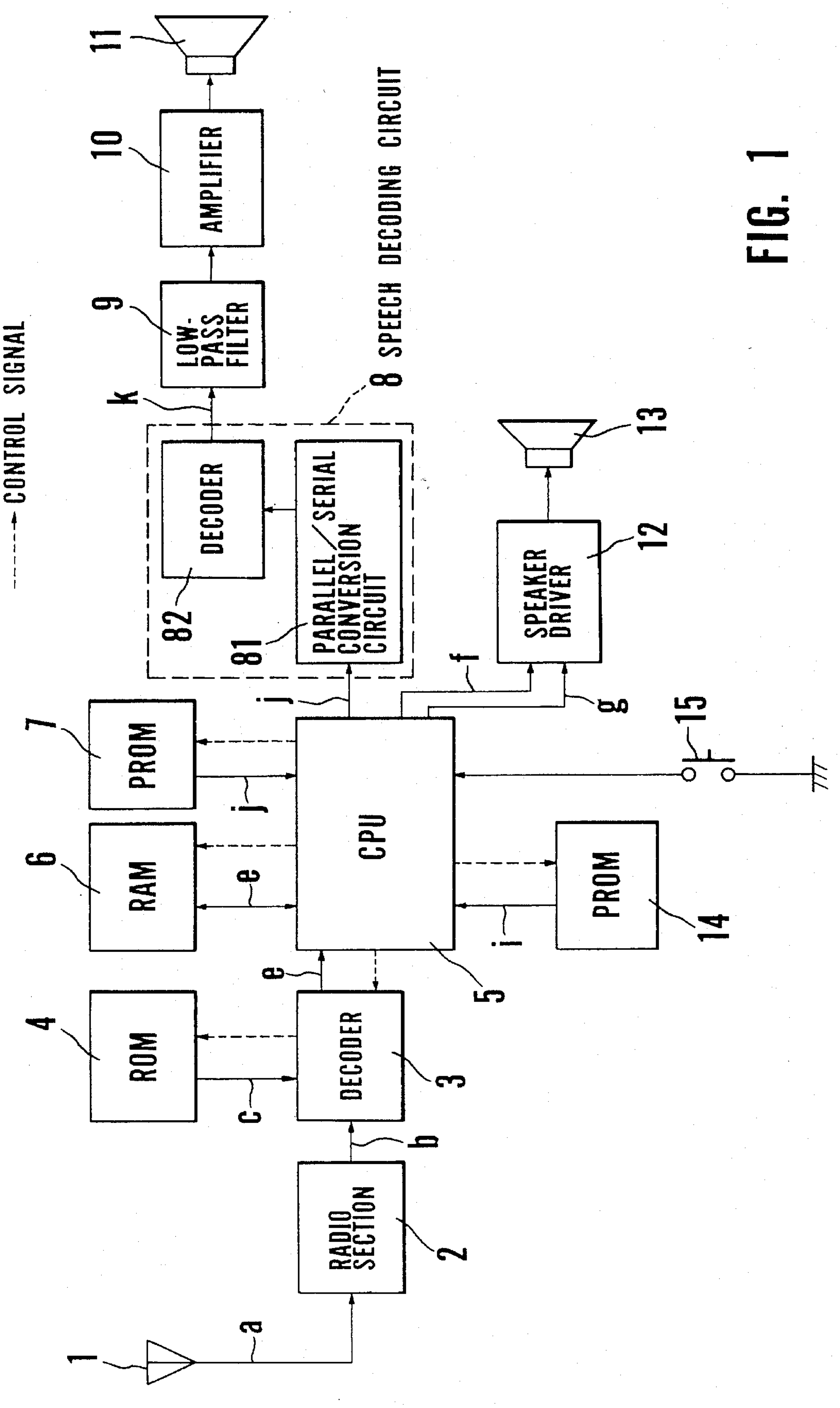
FIG. 1 is a block diagram showing a selective calling receiver of an embodiment of the present invention.

FIG. 1 is a block diagram showing a selective calling receiver of an embodiment of the present invention.

The selective calling receiver of this embodiment includes an antenna 1, a radio section 2, a decoder 3, a ROM 4, a CPU 5, a RAM 6, a PROM (Programmable ROM) 7, a PROM 14, a speech decoding circuit 8, a low-pass filter 9, an amplifier 10, a speaker 11, a speaker driver 12, a speaker 13, and a switch 15. The antenna 1 receives a radio wave as a selective call signal containing a telephone number to be dialed. The radio section 2 demodulates an RF signal a received by the antenna 1 and outputs a selective call signal b as a digital signal. The decoder 3 decodes the output from the radio section 2 and outputs a received message e. The ROM 4 serves to store the predetermined address of the selective calling receiver itself. The CPU 5 incorporates a memory for storing a program for performing data processing by controlling the decoder 3 and its peripheral circuits. The RAM 6 stores the received message e. The PROM 7 serves to store speech data obtained by digitizing speech corresponding to all the characters of messages which can be received. The PROM 14 serves to store the addresses of the speech data in the PROM 7, which corresponds to all the characters of the messages which can be received. The speech decoding circuit 8 receives speech data j corresponding to the received message e from the CPU 5, and decodes the speech data j into a speech signal k. The low-pass filter 9 removes high-frequency components from the speech signal k from the speech decoding circuit 8. The amplifier 10 amplifies the output from the low-pass filter 9. The speaker 11 outputs speech in accordance with the speech signal from the amplifier 10. The speaker driver 12 receives a beep signal f from the CPU 5, and causes the speaker 11 to output a beep sound to notify the user of the pager of the call. The speaker 13 is driven by the speaker driver 12 to output a beep sound. The switch 15 serves to designate the start or the like of speech output of the received message.

The speech decoding circuit 8 is constituted by a parallel/serial conversion circuit 81 and a decoder 82. The parallel/serial conversion circuit 81 converts speech data j as a parallel input into serial data. The decoder 82 converts the serial digital signal output from the parallel/serial conversion circuit 81 into a speech signal k as an analog signal.

An operation of the embodiment will now be described.

The RF signal a received by the antenna 1 is amplified and demodulated by the radio section 2 to be input to the decoder 3, as the selective call signal b which is a digital signal. The decoder 3 collates the address of the called selective calling receiver contained in the selective call signal b with a self-address c stored in the ROM 4. If they coincide with each other, the decoder 3 outputs the received message e contained in the selective call signal b to the CPU 5.

The CPU 5 stores the received message e in the RAM 6, and also outputs the beep signal f to the speaker driver 12. Upon reception of the beep signal f, the speaker driver 12 causes the speaker 13 to output a beep sound to inform the carrier of the selective calling receiver of the call. This beep sound is stopped after the lapse of a predetermined period of time.

Subsequent operations will be described below with reference to the flow charts shown in FIGS. 2, 3, 4 and 5.

Figure 2:
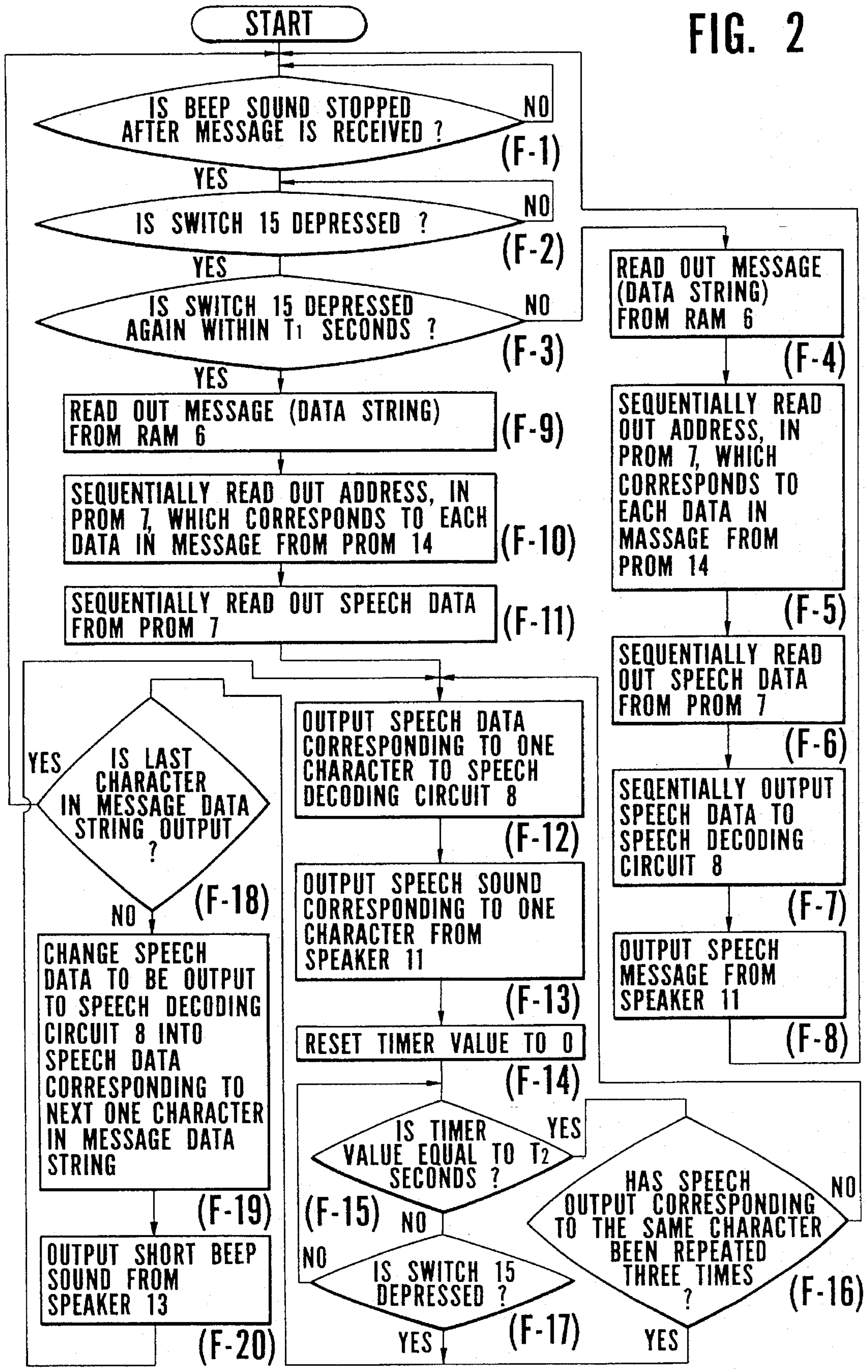
FIG. 2 is a flow chart showing an operation of the selective calling receiver shown in FIG. 1 according to the first embodiment of the present invention.

FIG. 2 is a flow chart showing the operation of the selective calling receiver shown in FIG. 1 according to the first embodiment.

When the beep sound is stopped (step F-1), it is checked whether the switch 15 is depressed (step F-2). It is then checked whether the switch 15 is depressed again within a predetermined period of time ($T_1$ seconds) after the switch 15 is depressed once (step F-3).

If it is determined that the switch 15 is depressed only once, the received message e is read out from the RAM 6 (step F-4). An address i of the speech data j, in the PROM 7, which corresponds to each character of the received message e is sequentially read out from the PROM 14 (step F-5). The speech data j corresponding to the address i is then sequentially read out from the PROM 7 (step F-6). This speech data j is sequentially output to the speech decoding circuit 8 (step F-7), thereby outputting the received message e, as a speech message, from the speaker 11 (step F-8).

If it is determined in step F-3 that the switch 15 is depressed, the received message e is read out from the RAM 6 (step F-9). The address i of the speech data j, in the PROM 7, which corresponds to each character of the received message e is sequentially read out from the PROM 14 (step F-10). The speech data j corresponding to the address i is sequentially read out from the PROM 7 (step F-11). Of the speech data j, only a data portion (unit information) corresponding to the first character of the received message is outputted to the speech decoding circuit 8 (step F-12). Thereafter, the speech signal k corresponding to the first character of the received message e is outputted from the speech decoding circuit 8. As a result, the first character portion is outputted, as a speech sound, from the speaker 11 via the low-pass filter 9 and the amplifier 10 (step F-13).

If the switch 15 is not depressed (step F-17) after the speech corresponding to the first character is output, and a predetermined period of time ($T_2$ seconds) has elapsed (steps F-14 and F-15), the speech output corresponding to the same single character is repeated three times (steps F-16 and F-12).

Assume that the switch 15 is depressed (step F-17) before the predetermined period of time ($T_2$ seconds) elapses (step F-15) after the speech corresponding to one character is outputted, or it is determined in step F-16 that the speech output corresponding to the same single character is performed three times. In this case, if the character currently output by speech is not the last character of the received message e (step F-18), the speech data j to be outputted to the speech decoding circuit 8 is changed to speech data corresponding to the next one character of the data string (character string) of the received message e (step F-19), and a character sectioning signal g is outputted to the speaker driver 12. With this operation, a short beep sound (character sectioning sound) is outputted from the speaker 13 (step F-20). Thereafter, speech output corresponding to the next character is repeated (step F-12).

If it is determined in step F-18 that the currently output character is the last character of the received message e, the flow returns to step F-1 to wait for the next message.

In the first embodiment shown in FIG. 2, the received message e is outputted by speech in units of characters. However, the present invention is not limited to this. One data may be constituted by a plurality of characters, and speech output may be performed one data, i.e., a plurality of characters, at a time. An embodiment exemplifying this operation will be described below with reference to the flow chart in FIG. 3.

Figure 3:
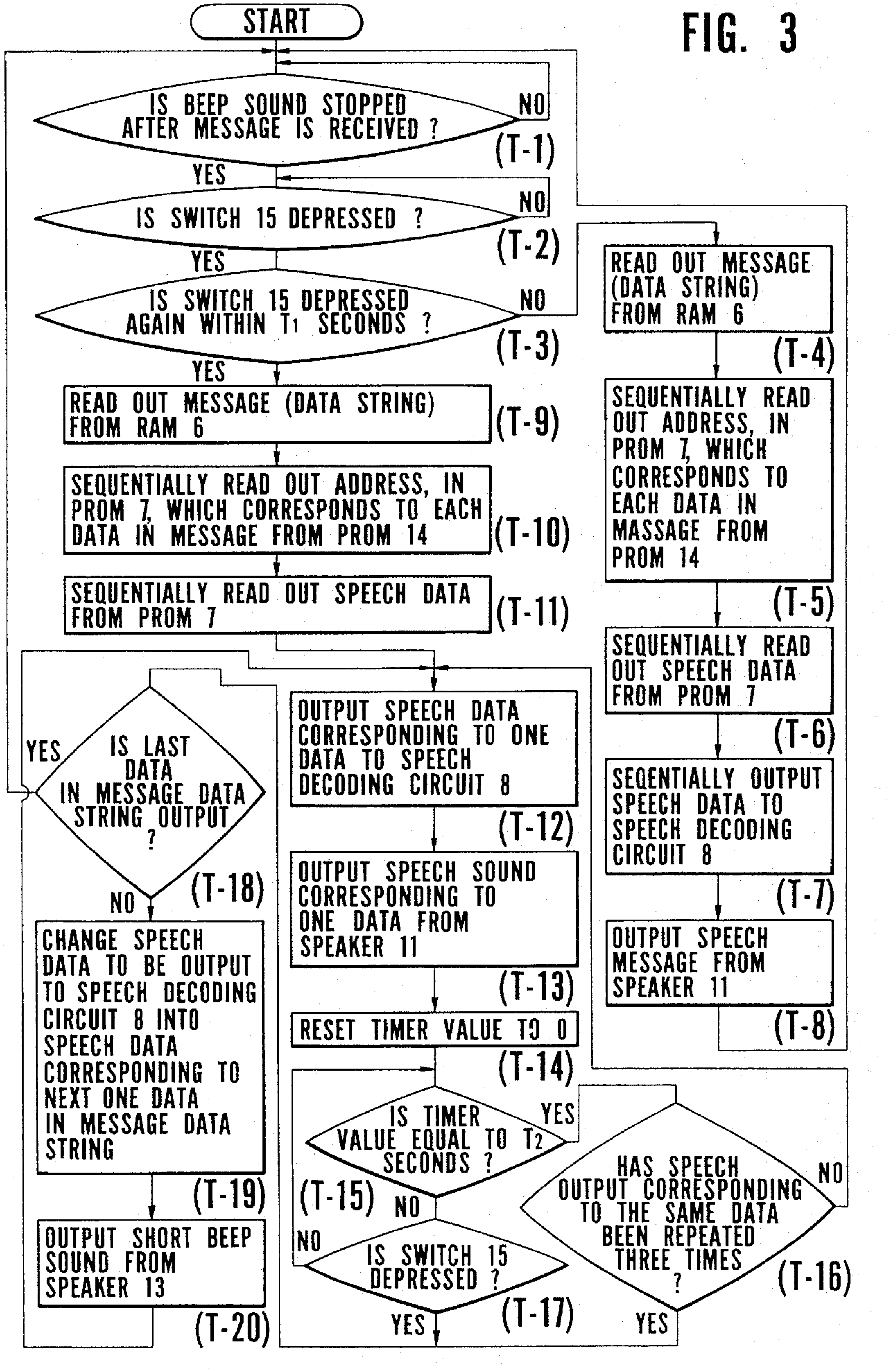
FIG. 3 is a flow chart showing an operation of the selective calling receiver shown in FIG. 1 according to the second embodiment of the present invention.

FIG. 3 is a flow chart showing the operation of the selective calling receiver shown in FIG. 1 according to the second embodiment.

Since steps T-1 to T-11 are the same as steps F-1 to F-11 in FIG. 2, a description thereof will be omitted.

Of speech data j, only the first one data portion (unit information constituted by a plurality of characters in this case) of a received message e is output to the speech decoding circuit 8 (step T-12). As a result, the speech decoding circuit 8 outputs a speech signal k corresponding to the first data portion of the received message e, and the signal is output as speech sound from the speaker 11 via the low-pass filter 9 and the amplifier 10 (step T-13).

If the switch 15 is not depressed (step T-17) after the speech corresponding to this data portion is output, and a predetermined period of time ($T_2$ seconds) has elapsed (steps T-14 and T-15), the speech output corresponding to the same single data is repeated three times (steps T-16 and T-12).

Assume that the switch 15 is depressed (step T-17) before the predetermined period of time ($T_2$ seconds) elapses (step T-15) after the speech corresponding to one data is outputted, or it is determined in step T-16 that the speech output corresponding to the same single data is performed three times. In this case, if the data currently output by a speech sound is not the last data of the received message e (step T-18), the speech data j to be outputted to the speech decoding circuit 8 is changed to speech data corresponding to the next one data of the data string (character string) of the received message e (step T-19), and a character sectioning signal g is outputted to the speaker driver 12. With this operation, a short beep sound (character sectioning sound) is output from the speaker 13 (step T-20). Thereafter, speech output corresponding to the next data is repeated (step T-12).

If it is determined in step T-18 that the currently output data is the last character of the received message e, the flow returns to step T-1 to wait for the next message.

In the first embodiment shown in FIG. 2, a speech output corresponding to the same character is repeated three times. However, speech output may be repeated a number of times other than three, or may be kept repeated until the switch is depressed. The third embodiment in which the speech output is kept repeated until the switch is depressed will be described below with reference to the flow chart in FIG. 4.

Figure 4:
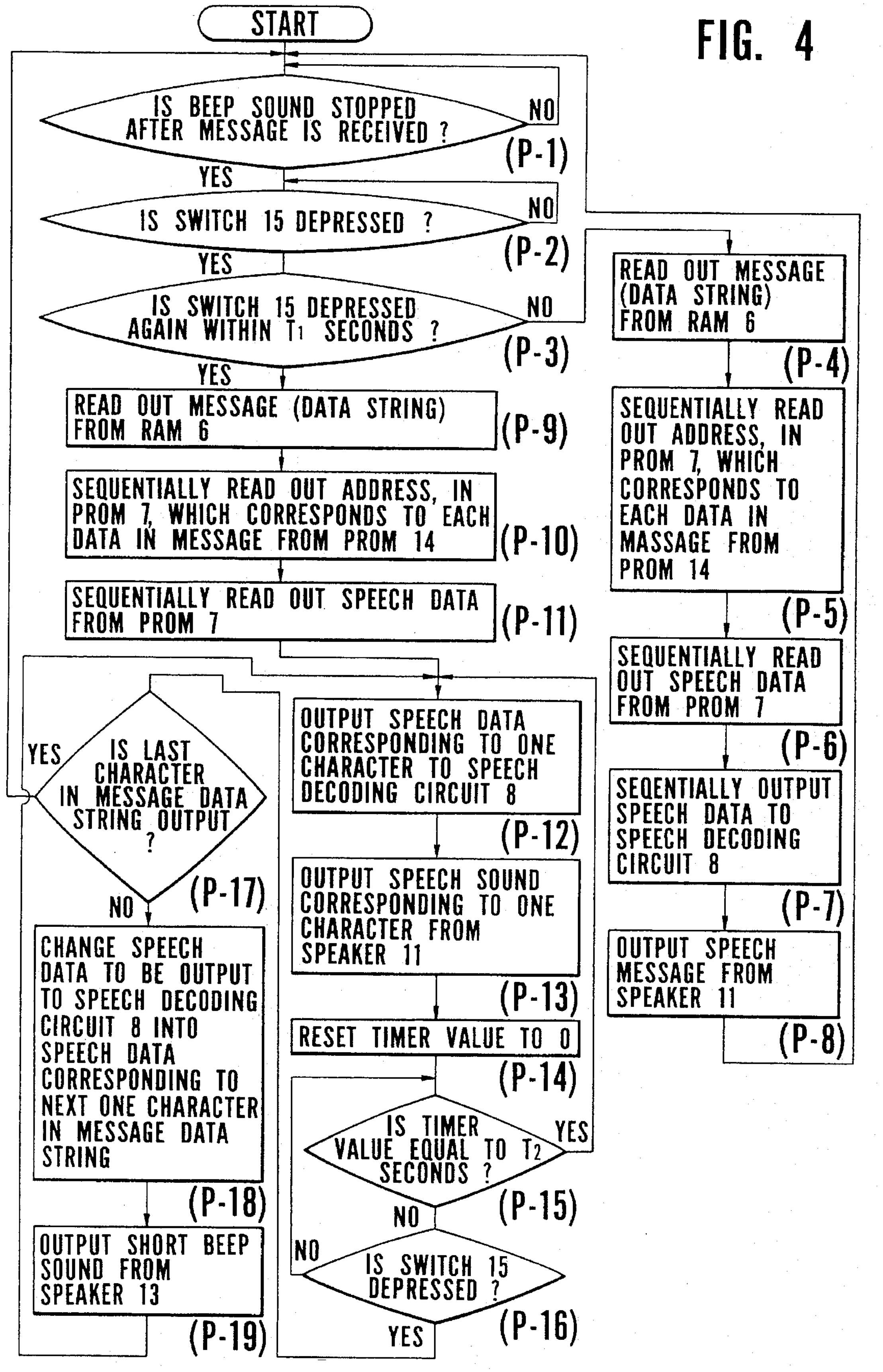
FIG. 4 is a flow chart showing an operation of the selective calling receiver shown in FIG. 1 according to the third embodiment of the present invention.

FIG. 4 is a flow chart showing the operation of the selective calling receiver shown in FIG. 1 according to the third embodiment.

Since steps P-1 to P-11 are the same as steps F-1 to F-11 in FIG. 2, a description thereof will be omitted.

Of speech data j, only a data portion corresponding to the first character of a received message e is outputted to the speech decoding circuit 8 (step P-12). Thereafter, a speech signal k corresponding to the first character of the received message e is outputted from the speech decoding circuit 8. As a result, the first character portion is outputted as speech sound from the speaker 11 via the low-pass filter 9 and the amplifier 10 (step P-13).

If the switch 15 is not depressed (step P-16) after the speech corresponding to the first character is output, and a predetermined period of time ($T_2$ seconds) has elapsed (steps P-14 and P-15), the speech output corresponding to the same single character is repeated three times (step P-12).

Assume that the switch 15 is depressed (step P-16) before the predetermined period of time ($T_2$ seconds) has elapsed (step P-15) after the speech corresponding to one character is outputted. In this case, if the character currently output by a speech sound is not the last character of the received message e (step P-17), the speech data j to be outputted to the speech decoding circuit 8 is changed to speech data corresponding to the next one character of the data string (character string) of the received message e (step P-18), and a character sectioning signal g is outputted to the speaker driver 12. With this operation, a short beep sound (character sectioning sound) is outputted from the speaker 13 (step P-19). Thereafter, a speech output corresponding to the next character is repeated (step P-12).

If it is determined in step P-17 that the currently output character is the last character of the received message e, the flow returns to step P-1 to wait for the next message.

In the first embodiment shown in FIG. 2, when the timer value becomes equal to $T_2$ seconds, a speech output corresponding to the same character is performed again. However, after the speech output corresponding to one character is performed once, the speech output corresponding to the same character may be performed again upon depression of the switch. The fourth embodiment exemplifying this operation will be described below with reference to the flow chart in FIG. 5.

Figure 5:
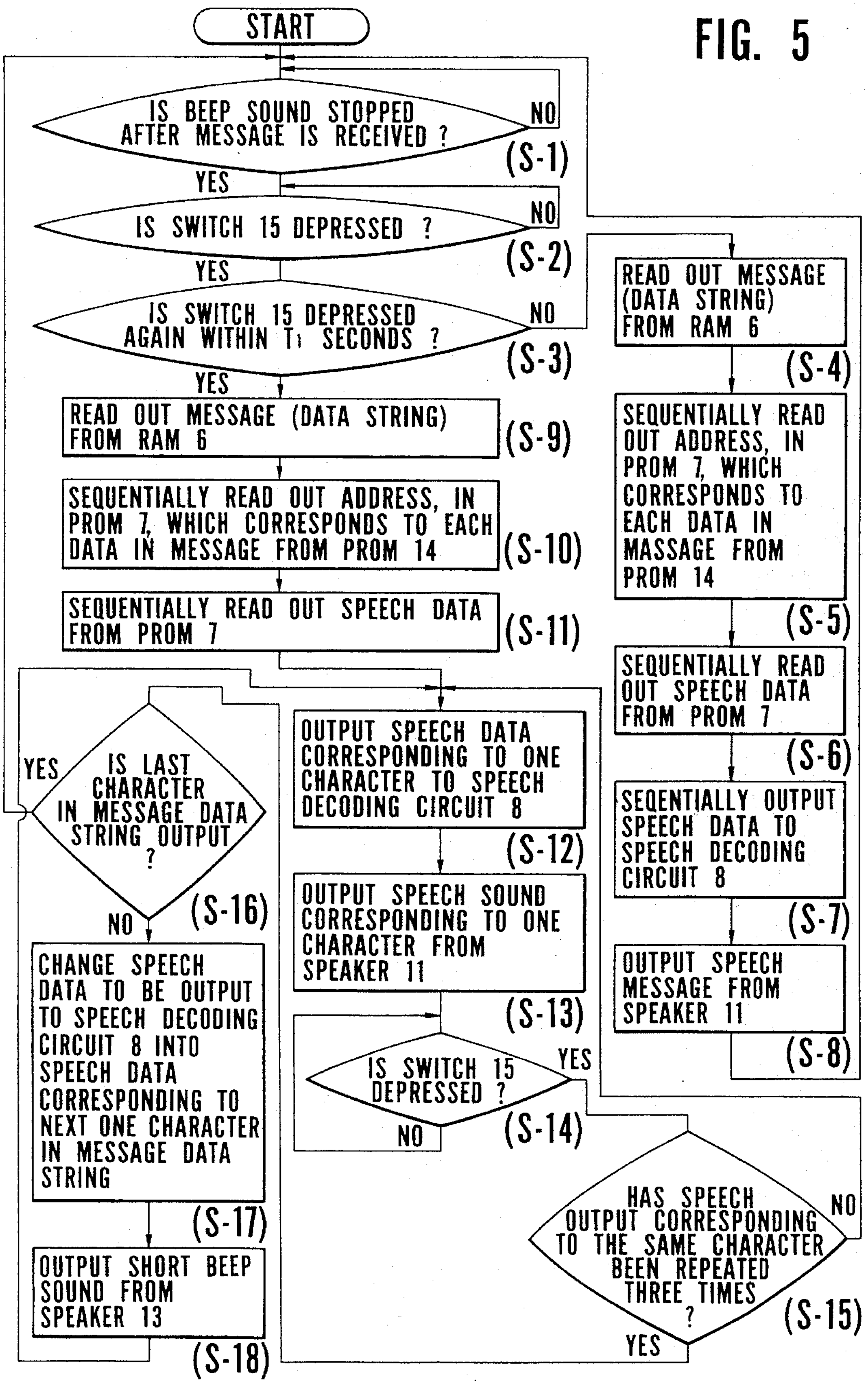
FIG. 5 is a flow chart showing an operation of the selective calling receiver shown in FIG. 1 according to the fourth embodiment of the present invention.

FIG. 5 is a flow chart showing the operation of the selective calling receiver shown in FIG. 1 according to the fourth embodiment.

Since steps S-1 to S-11 are the same as steps F-1 to F-11 in FIG. 2, a description thereof will be omitted.

Of speech data j, only a data portion corresponding to the first character of a received message e is outputted to the speech decoding circuit 8 (step S-12). Thereafter, a speech signal k corresponding to the first character of the received message e is outputtd from the speech decoding circuit 8. As a result, the first character portion is outputted as speech sound from the speaker 11 via the low-pass filter 9 and the amplifier 10 (step S-13).

If the speech corresponding to this single character is outputted, the flow waits for depression of the switch 15 (step S-14). If the switch 15 is depressed, then the speech output corresponding to the same single character is repeated three times (steps S-15 and S-12).

Assume that it is determined in step S-15 that the speech output corresponding to the same character is repeated three times. In this case, if the character currently output by a speech sound is not the last character of the received message e (step S-16), the speech data j to be outputted to the speech decoding circuit 8 is changed to speech data corresponding to the next one character of the data string (character string) of the received message e (step S-17), and a character sectioning signal g is outputted to the speaker driver 12. With this operation, a short beep sound (character sectioning sound) is outputted from the speaker 13 (step S-18). Thereafter, a speech output corresponding to the next character is repeated (step S-12).

If it is determined in step S-16 that the currently output character is the last character of the received message e, the flow returns to step S-1 to wait for the next message.

In the fourth embodiment shown in FIG. 5, after speech corresponding to one character is output once, the speech output corresponding to the same character is performed again upon depression of the switch. However, after speech corresponding to one character is outputted once, speech output corresponding to the next character performed upon depression of the switch. The fifth embodiment exemplifying this operation will be described below with reference to the flow chart in FIG. 6.

Figure 6:
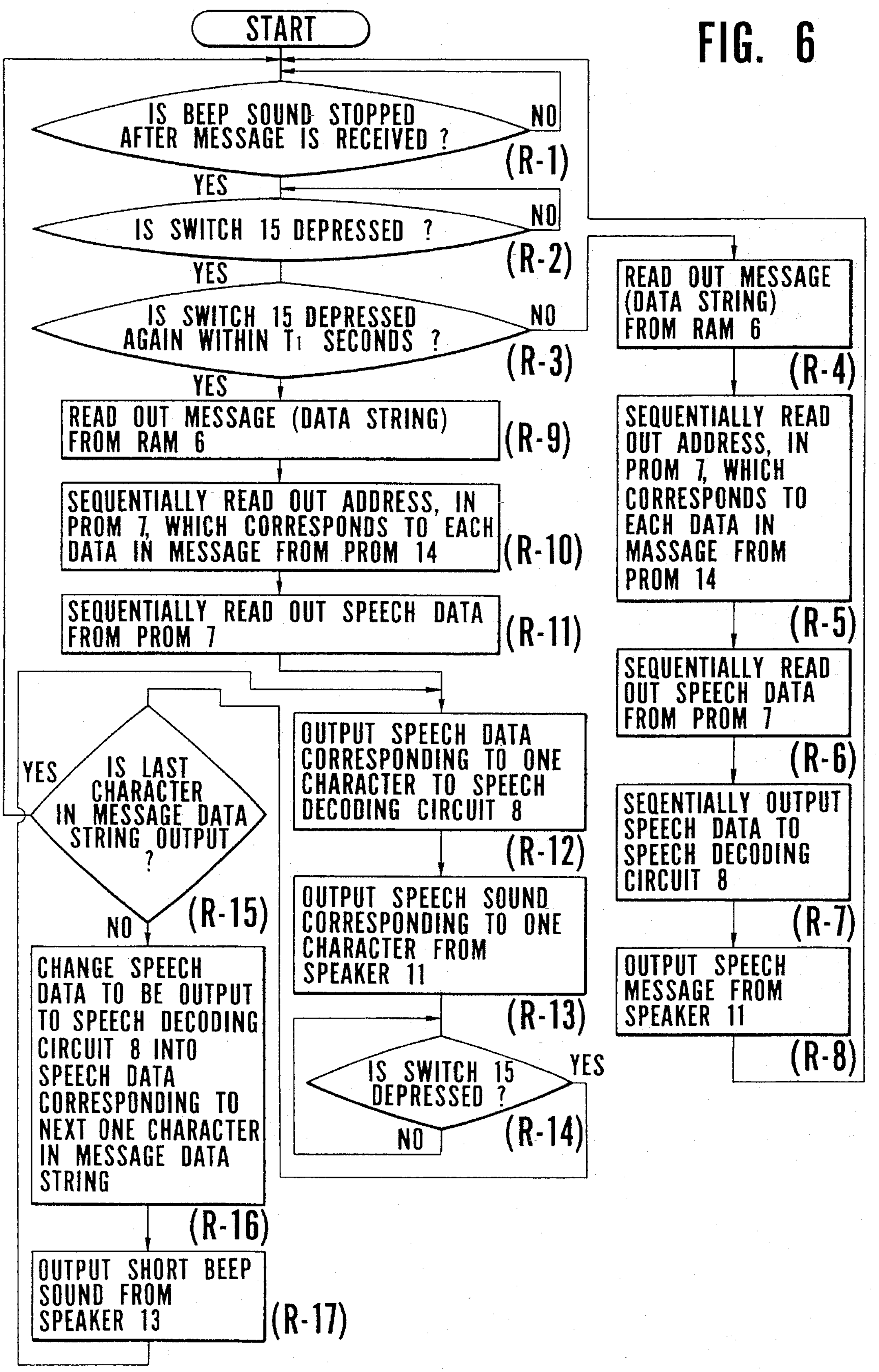
FIG. 6 is a flow chart showing an operation of the selective calling receiver shown in FIG. 1 according to the fifth embodiment of the present invention.

FIG. 6 is a flow chart showing the operation of the selective calling receiver shown in FIG. 1 according to the fifth embodiment.

Since steps R-1 to R-11 are the same as steps F-1 to F-11 in FIG. 2, a description thereof will be omitted.

Of speech data j, only a data portion corresponding to the first character of a received message e is outputted to the speech decoding circuit 8 (step R-12). Thereafter, a speech signal k corresponding to the first character of the received message e is output from the speech decoding circuit 8. As a result, the first character portion is outputted as speech sound from the speaker 11 via the low-pass filter 9 and the amplifier 10 (step R-13).

If the speech corresponding to this single character is outputted, the flow waits for depression of the switch 15 (step R-14). Assume that the switch 15 is depressed. In this case, if the character currently output by a speech sound is not the last character of the received message e (step R-15), the speech data j to be outputted to the speech decoding circuit 8 is changed to speech data corresponding to the next one character of the data string (character string) of the received message e (step R-16), and a character sectioning signal g is outputted to the speaker driver 12. With this operation, a short beep sound (character sectioning sound) is outputted from the speaker 13 (step R-17). Thereafter, a speech output corresponding to the next character is repeated (step R-12).

If it is determined in step R-15 that the currently output character is the last character of the received message e, the flow returns to step R-1 to wait for the next message.

In the above-described third to fifth embodiments, a speech output is performed in units of characters, similar to the first embodiment. However, it is apparent, according to the present invention, that in the third to fifth embodiments, a speech output can be performed in units of data constituted by a plurality of characters similar to the second embodiment.

As has been described above, according to the present invention, the user can hear a received message unit information (i.e., one data) at a time. Even if, therefore, a speech sound message is difficult to hear because of the environmental factors, such as noises, the user can repeatedly hear the message one data at a time until he or she confirms the contents of the data. This allows the user to reliably understand the message. In addition, when the user is to perform an operation while hearing a speech sound message as in the case wherein the user makes a telephone call while hearing a speech sound message (e.g., a telephone number to be dialed), the speech message can be outputted in accordance with the pace of the operation, thereby achieving an improvement in convenience of use.

What is claimed is:

1. A selective calling receiver comprising:

speech data storage means storing speech data corresponding to a predetermined message, speech output means outputting a speech sound on the basis of the speech data stored in said speech data storage means, first speech output control means reading out speech data corresponding to a message contained in a received selective calling signal from said speech data storage means and causing said speech output means to output a speech sound on the basis of the speech data, and second speech output control means sectioning the message contained in the received selective call signal into a predetermined number of unit informations, reading out speech data corresponding to a predetermined unit information of all the unit informations from said speech data storage means, and causing said speech output means to output a speech sound on the basis of the speech data, said second speech output control means performs a predetermined number of repetition of a speech sound corresponding to the predetermined unit information.

2. A receiver according to claim 1, wherein said second speech output control means sequentially outputs a speech sound corresponding to all the unit information from a first unit information in the message contained in the received selective calling signal.

3. A receiver according to claim 2, wherein said second speech output control means repeatedly outputs a speech sound corresponding to the same unit information.

4. A receiver according to claim 1, further comprising a first switch for operation by a user of said selective calling receiver, and wherein said second speech output control means outputs a speech sound corresponding to a next predetermined unit information when said first switch is operated.

5. A receiver according to claim 4, wherein said second speech output control means outputs a speech sound corresponding to a unit information different from unit information currently outputted by speech upon outputting a unit information sectioning sound.

6. A receiver according to claim 4, further comprising:

a second switch for operation by the user of said selective calling receiver;

a third switch for operated by the user; and selection means for selecting said first speech output control means when said third switch is not operated before the lapse of a predetermined period of time after said second switch is operated, and selecting said second speech output control means when said third switch is operated before the lapse of a predetermined period of time after said second switch is operated.

7. A receiver according to claim 6, wherein said first, second and third switches are physically the same switch.

8. A receiver according to claim 1, wherein said second speech output control means performs control to output a speech sound corresponding to a next predetermined unit information when the speech sound corresponding to the same unit information is repeatedly outputted a predetermined number of times.

9. A receiver according to claim 8, further comprising:

a first switch for operation by the user of said selective calling receiver;

a second switch for operation by the user; and selection means for selecting said first speech output control means when said second switch is not operated before the lapse of a predetermined period of time after said first switch is operated, and selecting said second speech output control means when said second switch is operated before the lapse of said predetermined period of time after said first switch is operated.

10. A receiver according to claim 9, wherein said first and second switches are physically the same switch.

11. A selective calling receiver comprising:

speech data storage means storing speech data corresponding to a predetermined message, speech decoding means converting input speech data into an analog signal and outputting the signal as a speech signal, speech output means outputting speech on the basis of the speech signal from said speech decoding means, speech output control means reading out speech data corresponding to a message contained in a received selective call signal from said speech data storage means, and outputting the speech data to said speech decoding means, a switch for operation by a user of said selective calling receiver; and sound generating means for generating a character sectioning sound, wherein said speech output control means outputs speech data corresponding to a first character in the message contained in the received selective call signal to said speech decoding means, and when said switch is depressed afterward, said speech output control means repeats outputting speech data corresponding to a next character in the message contained in the received selective call signal to said speech decoding means, after causing said sound generating means to generate said character sectioning sound, until speech data corresponding to all characters in the message contained in the received selective call signal is outputted to said speech decoding means.

12. A selective calling receiver comprising:

speech data storage means storing speech data corresponding to a predetermined message, speech decoding means converting input speech data into an analog signal and outputting the signal as a speech signal, speech output means outputting speech on the basis of the speech signal from said speech decoding means, speech output control means reading out speech data corresponding to a message contained in a received selective call signal from said speech data storage means, and outputting the speech data to said speech decoding means, a switch for operation by a user of said radio selective calling receiver; and sound generating means generating a character sectioning sound, wherein said speech output control means outputs speech data corresponding to a first character in the message contained in the received selective call signal to said speech decoding means a predetermined number of times and at predetermined time intervals, and when the speech data is outputted the predetermined number of times, and said switch is depressed within the predetermined period of time, said speech output control means repeats outputting speech data corresponding to a next character in the message contained in the received selective call signal to said speech decoding means a predetermined number of times and at predetermined time intervals, after causing said sound generating means to generate said character sectioning sound, until speech data corresponding to all characters in the message contained in the received selective call signal is outputted to said speech decoding means.

13. A selective calling receiver comprising:

speech data storage means storing speech data corresponding to a predetermined message, speech decoding means converting input speech data into an analog signal and outputting the signal as a speech signal, speech output means outputting speech on the basis of the speech signal from said speech decoding means, speech output control means reading out speech data corresponding to a message contained in a received selective call signal from said speech data storage means, and outputting the speech data to said speech decoding means, a switch for operation by a user of said radio selective call receiver; and sound generating means generating a unit information sectioning sound, wherein said speech output control means sections the message contained in the received selective call signal into a predetermined number of unit informations, and outputs speech data corresponding to a first unit information of all the unit informations to said speech decoding means a predetermined number of times and at predetermined time intervals, and when the speech data is outputted the predetermined number of times, and said switch is depressed within the predetermined period of time, said speech output control means repeats outputting speech data corresponding to a next unit information in the message contained in the received selective call signal to said speech decoding means a predetermined number of times and at predetermined time intervals, after causing said sound generating means to generate said unit information sectioning sound, until speech data corresponding to all the unit informations in the message contained in the received selective call signal is outputted to said speech decoding means.

14. A selective calling receiver comprising:

speech data storage means storing speech data corresponding to a predetermined message, speech decoding means converting input speech data into an analog signal and outputting the signal as a speech signal, speech output means outputting speech on the basis of the speech signal from said speech decoding means, speech output control means reading out speech data corresponding to a message contained in a received selective call signal from said speech data storage means, and outputting the speech data to said speech decoding means, a switch for operation by a user of said radio selective calling receiver; and sound generating means generating a character sectioning sound, wherein said speech output control means outputs speech data corresponding to a first character in the message contained in the received selective call signal to said speech decoding means at predetermined time intervals, and when said switch is depressed within the predetermined period at time, said speech output control means repeats outputting speech data corresponding to a next character in the message contained in the received selective call signal to said speech decoding means at predetermined time intervals, after causing said sound generating means to generate said character sectioning sound, until speech data corresponding to all characters in the message contained in the received selective call signal is outputted to said speech decoding means.

15. A selective calling receiver comprising:

speech data storage means storing speech data corresponding to a predetermined message, speech decoding means converting input speech data into an analog signal and outputting the signal as a speech signal, speech output means outputting speech on the basis of the speech signal from said speech decoding means, speech output control means reading out speech data corresponding to a message contained in a received selective call signal from said speech data storage means, and outputting the speech data to said speech decoding means, a switch for operation by a user of said radio selective calling receiver; and sound generating means generating a character sectioning sound, wherein said speech output control means outputs speech data corresponding to a first character in the message contained in the received selective call signal to said speech decoding means a predetermined number of times every time said switch is depressed, and when the speech data is outputted the predetermined number of times, said speech output control means repeats outputting speech data corresponding to a next character in the message contained in the received selective call signal to said speech decoding means a predetermined number of times every time said switch is depressed, after causing said sound generating means to generate said character sectioning sound, until speech data corresponding to all characters in the message contained in the received selective call signal is outputted to said speech decoding means.

* * * * *